Dec. 1, 1953   E. J. DELAMARRE ET AL   2,660,723
APPARATUS FOR THE STABILIZATION OF IVORY
Filed April 6, 1951                                2 Sheets-Sheet 1
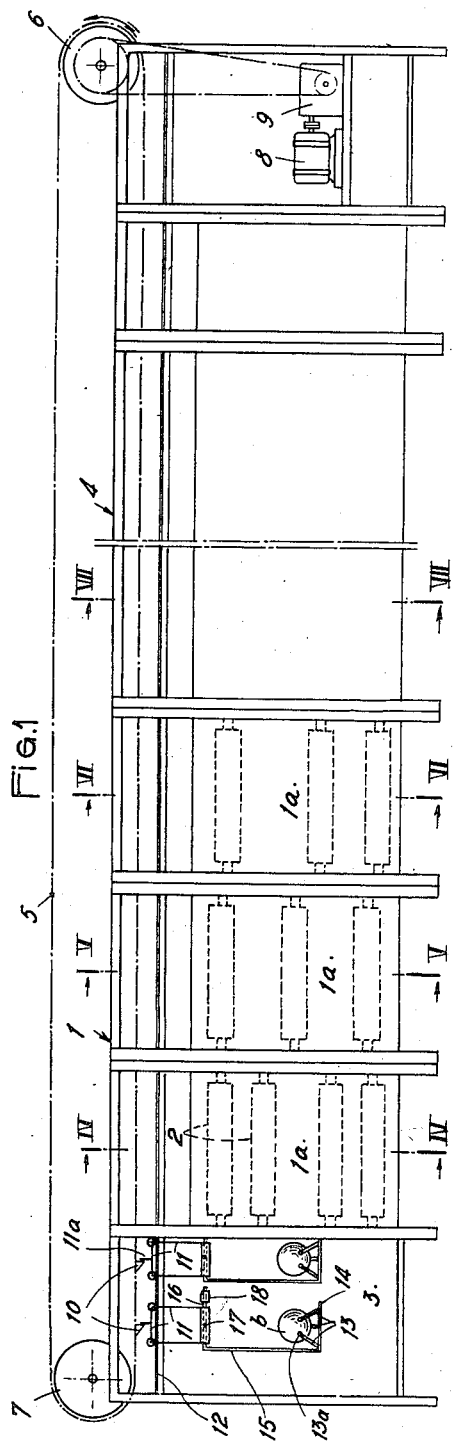
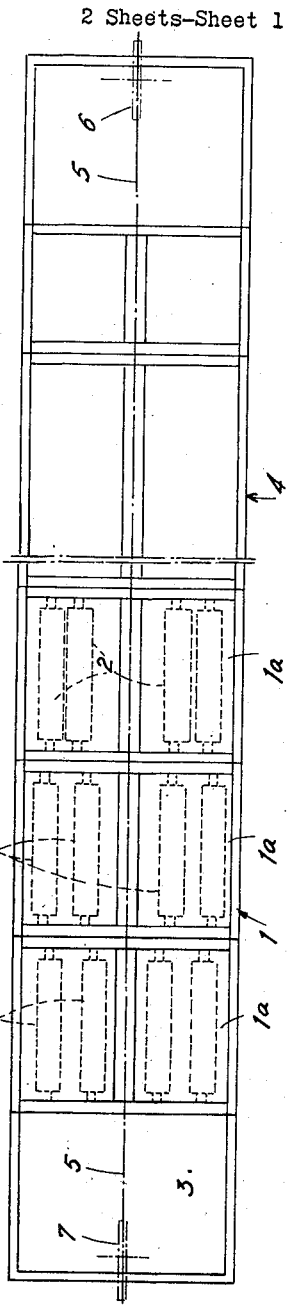
Inventors:
Emile J. Delamarre
and Roger L. Bréjoux
by: J. Delattre-Seguy
Attorney Inventors:
Emile J. Delamarre
and Roger L. Bréjoux
by J. Delattre-Seguy
Attorney Patented Dec. 1, 1953

2,660,723

UNITED STATES PATENT OFFICE 2,660,723

APPARATUS FOR THE STABILIZATION OF IVORY

Emile Jules Delamarre, Neuilly-sur-Seine, and Roger Louis Bréjoux, Paris, France Application April 6, 1951, Serial No. 219,726

Claims priority, application France March 6, 1951

1 Claim. (Cl. 34—56)

This invention relates firstly to a process for the stabilization of ivory in pieces of any shape, which comprises essentially treating said pieces with infra-red rays in such manner that each point of the surface of said pieces receives a substantially equal energizing action which decreases as the treatment proceeds and is adapted to cause a reduction of the order of one twentieth to one tenth of the percentage of moisture contained in the ivory, and then gradually cooling said pieces.

Due to this treatment, the ivory is partly dehydrated and undergoes an accelerated ageing with a correlative destruction of the living fibres, from which results the stabilization of the shape and size of the ivory pieces, which is particularly desirable in the case of billiard balls.

The invention relates secondly to an apparatus for the execution of the above process, which apparatus essentially comprises an active tunnel, infra-red rays emitting elements mounted in said active tunnel, an empty heat-insulated tunnel placed directly behind said active tunnel, and means for displacing the pieces to be treated through the interior of said tunnels.

When the treatment is applied to pieces of spherical shape, the infra-red rays emitting means are placed concentrically with respect to the axis of the tunnel and the pieces are placed so that their centres move along said axis.

A non limitative embodiment of said apparatus may further present one or more of the following characteristic features:

(a) The active tunnel comprises several sections or compartments fitted with infra-red rays emitting elements the number of which decreases in the direction in which the pieces are displaced through the tunnel.

(b) The pieces are carried by supports having only a small number of distinct points of contact with said pieces and suspended each on a guided crab adapted to be displaced by an endless conveyor.

(c) Each of said supports is suspended on one arm of a beam which is pivotally mounted on said crab and the other arm of which carries a counterweight the value of which is determined in such manner that the piece is automatically discharged from said support as soon as the reduction of weight of said piece is slightly greater than that corresponding to the desired reduction of the percentage of moisture of the ivory.

The appended drawings show by way of example an embodiment of the apparatus according to the invention, in the case where the pieces to be treated are billiard balls.

Fig. 1 is a longitudinal side view of the apparatus.

Fig. 2 is a plan view thereof.

As shown on the drawings, the apparatus comprises a tunnel 1 provided with infra-red rays emitting elements which are placed and designed in such manner that the value of the flux received by the surface of the balls, which may be expressed in calory-hours per $cm.^2$, decreases from the entrance to the outlet of the tunnel, and that the rays emitted by said elements are concentrated on each ball.

Figure 3:
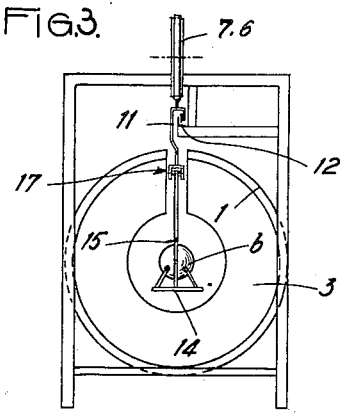
Fig. 3 is an end view of the entrance of the apparatus.
Figure 4:
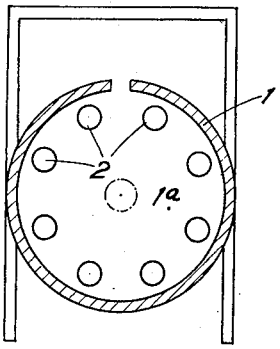
Figs. 4, 5, 6 and 7 are respectively cross sections on lines IV—IV, V—V, VI—VI and VII—VII of Fig. 1.
Figure 5:
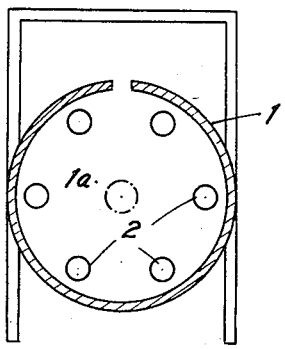
Figure 6:
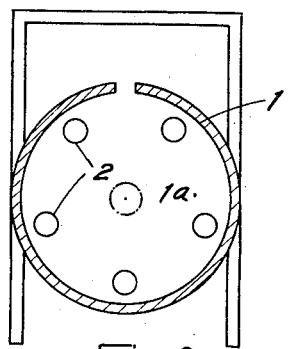

To this effect, in the present embodiment the cylindrical tunnel beginning at the charging station 3 comprises a plurality of sections or compartments 1a, for example three, each of which contains a certain number of emitting elements 2 placed concentrically with respect to the axis of the tunnel along which the centre of each ball advances, as it will be described hereinafter, the number of these elements decreasing in the direction of advance of the balls. Thus, for example, the first compartment (Fig. 4) is provided with eight elements, the second compartment (Fig. 5) with six elements and the third compartment (Fig. 6) with five elements.

The elements 2 emit infra-red rays the wave lengths of which are preferably comprised between 12,000 and 14,000 Angstrom. They may be of any appropriate type adapted to act in accordance with the law of the black body, with any source of energy: electricity, gas, gas-oil, etc.

In the present case, the emitting elements 2 are silver plated on that half of their cylindrical surface which, with respect to their proper axis, is opposite to the axis of the tunnel.

Figure 7:
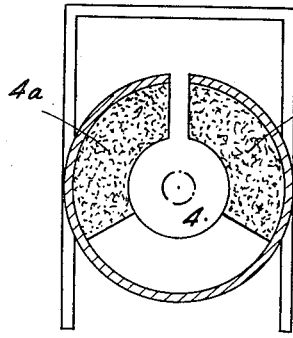
Figure 8:
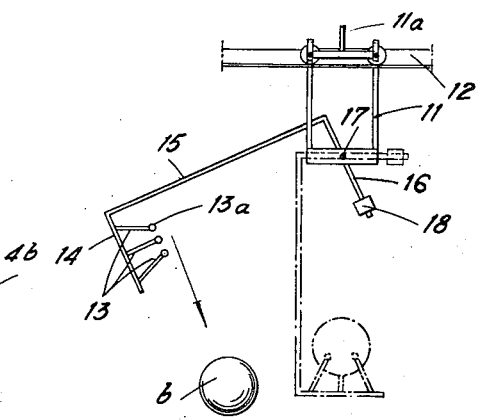
Fig. 8 shows at a larger scale an embodiment of the supporting and transporting means for a ball, said means being represented in two positions: the normal position, at the beginning of the treatment, and the final position, when the ball is discharged after a determined reduction of its weight.

The tunnel 1 is followed without interval by another tunnel 4 which is inactive, that is to say, which contains no emitting elements, but has the purpose of moderating the cooling of the treated pieces, so that this cooling takes place very progressively. The tunnel 4, which is longer than the tunnel 1, is advantageously heat-insulated at 4a, 4b (Fig. 7) so as to reduce the losses of heat by convection.

A mechanical, continuously operating advancing device makes it possible to submit the ivory billiard balls to the action of the infra-red rays emitted by the elements 2 for a determined time, of the order of several minutes, this time varying following the quality of the ivory, its origin and the percentage of moisture removed therefrom, say from 10 to 20 minutes per compartment, and then to cool these balls progressively while they pass through the tunnel 4, during a considerably longer time, of the order of 1 to 2 hours, so as to bring them smoothly back to room temperature.

Such a device not only ensures a constant rhythm of the treatment, but further makes it possible, when the sources emitting the infra-red rays are discontinuous in the direction of advance (as in the described embodiment), to substantially integrate the amounts of energy received by the pieces during their treatment in the different compartments of the tunnel, until there is reached a suitable value corresponding to the required total amount of calories.

The device comprises for example, as shown, an endless chain 5 passing over two pulleys 6 and 7, one of which is driven by a motor 8, through a speed reducing gear 9 and a transmission. Said chain is provided with regularly spaced dogs 10 each of which is adapted to cooperate with a finger 11a so as to carry along a supported traveller 11 rolling on a rail 12, each supported traveller being connected to a support for a billiard ball b. Each support is advantageously designed in such manner that it has with the ball b only simple points of contact, for example three, which are remote from each other. To this effect, said support comprises three rods 13 each of which has at its end a small rounded head 13a, the rods 13 being mounted on a small disk 14 secured to an arm 15 by which the support is suspended to the supported traveller 11. The length of the arm 15 is determined in such manner that the centre of the ball is located on the axis of the tunnel.

In the case of the described embodiment, which relates to the treatment of billiard balls, as in any other case in which all the pieces to be treated have the same weight, the control of the treatment can be effected under the control of the weight of the pieces being treated, the support for these pieces being designed in such manner that the pieces which have undergone during their advance a reduction of weight exceeding a value determined in terms of their initial weight are automatically withdrawn from the action of the rays, the said determined value characterising the end of the desired treatment.

In the apparatus of the present embodiment and for the above defined purpose, the arm 15, instead of being directly suspended to the supported traveller 11, is suspended to one arm of a beam 16 pivotally mounted at 17 on the supported traveller and the other arm of which carries a counterweight 18 the value of which is determined in such manner that the beam swings out to its maximum inclination, by which the ball is eliminated, only when said ball has undergone a reduction of weight exceeding slightly that which is desired. Thus, the eliminated balls, which fall to the bottom of the tunnel, are withdrawn from the continued action of the infra-red rays and can be removed.

Obviously, the invention is not limited to the embodiment which has been described and shown only by way of example, and the said invention covers also, among others, the following modifications:

The advance of the treated pieces, instead of being continuous, could be effected discontinuously. In this case, a time regulator limiting the time during which the treated pieces remain in each compartment can be used in order to ensure the regularity of the treatment.

The sources of infra-red rays could be continuous in the direction of the advance, that is to say, these sources could extend over the entire length of the tunnel 1, in which case the diminution of the flux received by the balls could be obtained by any appropriate means, for example by giving the speed of advance of the balls a value which increases as they advance.

When the process according to the invention is applied to unfinished articles of ivory which have no axis of symmetry or of revolution, it belongs of course to the features of this process that the tunnel 1 is provided with emitting elements designed and/or located in such manner that they exert upon the treated articles an energizing action which is substantially equal on all the portions of their surface.

We claim:

An apparatus for the stabilization of ivory in pieces of any shape comprising an active tunnel, infra-red rays emitting elements mounted in said active tunnel, a heat-insulated tunnel placed directly behind said active tunnel and means for displacing the pieces to be treated through the interior of said tunnels, said means for displacing comprising an endless conveyor moving along said tunnels and, for each of said pieces, a supported traveller adapted to be displaced by said endless conveyor, a beam pivotally mounted on said traveller, a support suspended on one arm of said beam, said support having a small number of distinct points of contact for supporting said piece, and a counterweight mounted on the other arm of said beam, the value of said counterweight being such that said beam automatically tilts for discharging said piece as soon as the reduction of weight of said piece is slightly greater than that corresponding to the desired percentage of reduction of the moisture of the ivory.

EMILE JULES DELAMARRE.
ROGER LOUIS BRÉJOUX.

References Cited in the file of this patent

UNITED STATES PATENTS

| Number | Name | Date |
| --- | --- | --- |
| 1,053,162 | Denney | Feb. 18, 1913 |
| 1,334,840 | Collins | Mar. 23, 1920 |
| 2,007,044 | Francis | July 2, 1935 |
| 2,169,772 | Schweitzer | Aug. 15, 1939 |
| 2,355,459 | Miskella | Aug. 8, 1944 |
| 2,391,195 | Ross et al. | Dec. 18, 1945 |
| 2,391,919 | Penny | Jan. 1, 1946 |
| 2,450,590 | Gullo | Oct. 5, 1948 |

FOREIGN PATENTS

| Number | Country | Date |
| --- | --- | --- |
| 584,168 | Great Britain | Jan. 8, 1947 |

OTHER REFERENCES

Dictionary of Applied Chemistry, by Thorpe, vol. III, page 687. Published 1922.

Industrial Applications of Infra-Red, by Hall. Copyright 1947. Pages 74 and 75.